US008929613B2

(12) United States Patent
Yoshio

(10) Patent No.: US 8,929,613 B2
(45) Date of Patent: Jan. 6, 2015

(54) DEVICE AND METHOD FOR INTERNALLY AND EXTERNALLY ASSESSING WHITELISTS

(75) Inventor: Hiroaki Yoshio, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 140 days.

(21) Appl. No.: 13/876,028

(22) PCT Filed: Jun. 3, 2011

(86) PCT No.: PCT/JP2011/003150
§ 371 (c)(1),
(2), (4) Date: Mar. 26, 2013

(87) PCT Pub. No.: WO2012/042702
PCT Pub. Date: Apr. 5, 2012

(65) Prior Publication Data
US 2013/0177238 A1 Jul. 11, 2013

(30) Foreign Application Priority Data
Sep. 27, 2010 (JP) ................................ 2010-214883

(51) Int. Cl.
G06K 9/00 (2006.01)
(52) U.S. Cl.
CPC ........... G06K 9/00288 (2013.01); Y10S 902/03 (2013.01)
USPC ............ 382/115; 340/5.83; 356/71; 713/186; 902/3
(58) Field of Classification Search
USPC ............. 382/115–127; 340/5.8–5.86; 356/71; 713/186; 902/3
See application file for complete search history.

(56) References Cited

U.S. PATENT DOCUMENTS

| 6,678,404 B1 * | 1/2004 | Lee et al. ....................... 382/155 |
| 7,127,087 B2 * | 10/2006 | Huang et al. .................. 382/118 |
| 7,142,697 B2 * | 11/2006 | Huang et al. .................. 382/118 |

(Continued)

FOREIGN PATENT DOCUMENTS

| JP | 11-175718 | 7/1999 |
| JP | 2007-316809 | 12/2007 |
| JP | 2010-170201 | 8/2010 |

OTHER PUBLICATIONS

Belhumer et al., "Eigenfaces vs. Fisherfaces: Recognition Using Class Specific Linear Projection", IEEE Transaction on Pattern Analysis and Machine Intelligence, vol. 19, No. 7, Jul. 1997, pp. 711-720.

*Primary Examiner* — Aaron W Carter
(74) *Attorney, Agent, or Firm* — Greenblum & Bernstein, P.L.C.

(57) ABSTRACT

A white list inside or outside determining apparatus includes: a first feature data extracting unit which extracts first feature data from an image by using a first transformation formula created based on preliminary learning images; a second feature data extracting unit which extracts second feature data from an image by using a second transformation formula created from the preliminary learning images and application learning images; a first matching unit which performs matching between a registration image and a collation image by using the first transformation formula; and a second matching unit which performs matching between a registration image and a collation image by using the second transformation formula. Weights of a matching result of the first matching unit and a matching result of the second matching unit are changed according to the number of preliminary learning images and the number of application learning images.

4 Claims, 12 Drawing Sheets

(56) References Cited

U.S. PATENT DOCUMENTS

| | | | |
|---|---|---|---|
| 7,203,346 B2 * | 4/2007 | Kim et al. | 382/118 |
| 7,630,526 B2 * | 12/2009 | Bober et al. | 382/118 |
| 7,702,489 B2 * | 4/2010 | Jojic et al. | 703/2 |
| 7,801,354 B2 * | 9/2010 | Yokono | 382/159 |
| 7,856,122 B2 * | 12/2010 | Enomoto | 382/115 |
| 8,270,707 B2 * | 9/2012 | Iwai et al. | 382/159 |
| 8,411,906 B2 * | 4/2013 | Okubo et al. | 382/115 |
| 8,509,537 B2 * | 8/2013 | Perronnin et al. | 382/186 |
| 8,577,151 B2 * | 11/2013 | Hu | 382/195 |
| 8,666,176 B2 * | 3/2014 | Oshima | 382/227 |
| 2003/0194113 A1 | 10/2003 | Yamaguchi et al. | |
| 2003/0215115 A1 * | 11/2003 | Kim et al. | 382/118 |
| 2004/0088272 A1 * | 5/2004 | Jojic et al. | 706/13 |
| 2005/0147291 A1 * | 7/2005 | Huang et al. | 382/159 |
| 2005/0147292 A1 * | 7/2005 | Huang et al. | 382/159 |
| 2006/0034517 A1 * | 2/2006 | Bober et al. | 382/190 |
| 2007/0014433 A1 * | 1/2007 | Yano | 382/103 |
| 2007/0098255 A1 * | 5/2007 | Yokono | 382/159 |
| 2007/0177807 A1 * | 8/2007 | Enomoto | 382/224 |
| 2010/0208983 A1 * | 8/2010 | Iwai et al. | 382/159 |
| 2011/0091108 A1 * | 4/2011 | Oshima | 382/173 |
| 2012/0033874 A1 * | 2/2012 | Perronnin et al. | 382/159 |

\* cited by examiner

FIG. 7

OPTIMUM FACE AUTHENTICATION APPARATUS WITH COMBINATION OF APPLICATION LEARNING ON SITE AND PRELIMINARY LEARNING FOR SEVERAL THOUSAND PERSONS HAVING VARIOUS FACE DIRECTIONS AND ILLUMINATION CONDITIONS CAN BE PROVIDED

| KIND OF REGISTRATION DATA | EFFECT |
|---|---|
| WHEN NUMBER OF FRONTAL FACES IS LARGE | CHANGE IN FACE DIRECTION CAN BE HANDLED BY SECOND TRANSFORMATION FORMULA. ALSO, WHEN NUMBER OF IMAGES EXCEPT FRONTAL FACES ACQUIRED IN REAL ENVIRONMENT IS SMALL, SITUATION OF SYSTEM INTO UNSTABLE DUE TO TOO DEPENDENCE ON SECOND TRANSFORMATION FORMULA CAN BE REDUCED. |
| WHEN ILLUMINATION CONDITION DIFFERS FROM THAT OF PRELIMINARY LEARNING | DIFFERENCE IN ACTUAL ILLUMINATION CONDITION CAN BE COVERED BY SECOND TRANSFORMATION FORMULA |

DEVICE AND METHOD FOR INTERNALLY AND EXTERNALLY ASSESSING WHITELISTS

TECHNICAL FIELD

The present invention relates to a white list inside or outside determining apparatus and method capable of accurately determining whether a person acquired in a new installation environment is a person registered in a white list even when the installation environment is changed.

BACKGROUND ART

FIG. 12 shows a related-art white list inside or outside determining apparatus and method. In a related-art example, a learning unit 121 obtains a subspace transformation formula 123 from a lot of face images for learning by preliminary learning 122. Next, using the subspace transformation formula 123, a feature amount of an image of a person to be registered in a white list input from a registration face input 125 is obtained by registration face feature data extraction 126 and is held in a registration face feature data group 127.

On the other hand, when a face image to be collated is input from a collation face input 129, a feature amount of a face to be collated is extracted by collation face feature data extraction 130, and matching with a feature amount of a face registered in the registration face feature data group 127 is performed by a matching unit 131.

As a result, an identical determining unit 132 determines whether the feature amount of the collation face is identical to the feature amount of a face image of the white list held in the registration face feature data group 127.

Also, Patent Document 1 shows a method for acquiring a feature amount by creating a subspace in consideration of an aging change or by creating subspaces for respective regions of a face, rather than obtaining a feature amount of the entire face.

Further, there is a white list inside or outside determining apparatus capable of authenticating an individual even when a light source changes, by a method (FisherFace) for obtaining an eigenface (PCA) and then minimizing within-class variance and maximizing between-class variance (FLD) and further facilitating calculation of FLD (Non-Patent Document 1).

Hereinafter, PCA (Principal Component Analysis), FLD (Fisher's First Discriminant) and a kernel fisher method described in Non-Patent Document 1 will be described briefly.

PCA is means for reducing dimensionality of image space by a transformation formula in which Mathematical Formula 3 is obtained when N face images are expressed by Mathematical Formula 1 and a variance matrix of images is expressed by Mathematical Formula 2.

$$\{ x_1 \quad x_2 \quad \ldots \quad x_N \}$$ [Mathematical Formula 1]

$$S_T = \sum_{K=1}^{N} (x_k - \mu)(x_k - \mu)^T$$ [Mathematical Formula 2]

$$W_{PCA} = \operatorname*{argmax}_{W} |W^T S_T W| = [ w_1 \quad w_2 \quad \ldots \quad w_{m_p} ]$$ [Mathematical Formula 3]

Also, FLD is means for minimizing within-person variance and maximizing between-person variance, and a transformation formula of Mathematical Formula 6 is obtained when the between-person variance is expressed by Mathematical Formula 4 and the within-person variance is expressed by Mathematical Formula 5.

$$S_B = \sum_{i=1}^{C} N_i (\mu_i - \mu)(\mu_i - \mu)^T$$ [Mathematical Formula 4]

$$S_W = \sum_{i=1}^{C} \sum_{x_k \in X_i} (x_k - \mu_i)(x_k - \mu_i)^T$$ [Mathematical Formula 5]

$$W_{FLD} = \operatorname*{argmax}_{W} \frac{|W^T S_B W|}{|W^T S_W W|}$$ [Mathematical Formula 6]

Finally, a FisherFace method is a method capable of facilitating calculation of FAD even when the number of images is small, and is expressed by Mathematical Formula 7, Mathematical Formula 8 and Mathematical Formula 9.

$$W_{FisherFace}^T = W_{fld}^T W_{pca}^T = [ w_1 \quad w_2 \quad \ldots \quad w_c ]$$ [Mathematical Formula 7]

$$W_{fld} = \operatorname*{argmax}_{W} \frac{|W^T W_{pca}^T S_B W_{pca} W|}{|W^T W_{pca}^T S_W W_{pca} W|}$$ [Mathematical Formula 8]

$$W_{pca} = \operatorname*{argmax}_{W} |W^T S_T W|$$ [Mathematical Formula 9]

$$W_{fld} = \operatorname*{argmax}_{W} \frac{|W^T W_{pca}^T S_B W_{pca} W|}{|W^T W_{pca}^T S_W W_{pca} W|}$$

Accordingly, dimensionality of $W_{FLD}$ can be reduced to $c-1$.

RELATED ART DOCUMENTS

Patent Documents

Patent Document 1: JP A-11-175718

Non-Patent Documents

Non-Patent Document 1: "Eigenfaces vs. Fisherfaces: Recognition Using Class Specific First Projection", Peter N. Belhumer, Joao P. Hespanha, and David J. Kriegman, IEEE Transaction on Pattern Analysis and Machine Intelligence, vol. 19, No. 7 July, pp 711-720

SUMMARY OF THE INVENTION

Problem to be Solved by the Invention

However, in the related art, as shown in FIG. 13, when photographing conditions of a face image used in the learning unit 121, a face image registered in a white list used in a registration unit 124 and a face image of a collation unit 128 differ from one another, conditions for obtaining feature amounts also differ, which results in a problem of increasing false alarm. Also, when registration data (black list) increases, it becomes difficult to distinguish a person registered in the white list, which results in a problem of increasing false alarm.

Further, in a case in which a transformation formula for creating subspace is created by images photographed in a real environment, if the number of images for creating subspace is small, a stable result cannot be obtained.

An object of the invention is to solve these problems, and is to provide a white list inside or outside determining apparatus and method capable of determining whether a collation person is registered in a white list even when photographing conditions in a learning unit, a registration unit and a collation unit differ or the number of images adapted for a different environment is small.

Means for Solving the Problem

The present invention provides a white list inside or outside determining apparatus including: first feature data extracting means for extracting first feature data from an image by using a first transformation formula created based on a plurality of preliminary learning images; second feature data extracting means for extracting second feature data from an image by using a second transformation formula created from the preliminary learning images and a plurality of application learning images; first matching means for performing matching between a registration image and a collation image by using the first transformation formula; and second matching means for performing matching between a registration image and a collation image by using the second transformation formula, wherein weights of a matching result of the first matching means and a matching result of the second matching means are changed according to the number of preliminary learning images and the number of application learning images.

With this configuration, weighting of the matching result of the first matching means and the matching result of the second matching means can be changed according to a ratio between the number of preliminary learning images and the number of application learning images.

In the white list inside or outside determining apparatus of the invention, the weight of the matching result of the second matching means is decreased as the number of application learning images becomes smaller.

With this configuration, even when the number of application learning images is small and hence the matching result by the second transformation formula does not become stable, a stable result can be obtained by increasing the weight of matching by the first transformation formula. Further, when the number of application learning images is large, a matching result adapted for an environment in which the application learning images are acquired can be obtained by increasing the weight of the matching result by the second transformation formula.

Further, in the white list inside or outside determining apparatus of the invention, the collation image is registered as the registration image when a degree of similarity is larger than a predetermined threshold value.

With this configuration, the collation image can be registered as a new registration image when the degree of similarity between the collation image and the registration image is larger than the predetermined threshold value.

Advantages of the Invention

In the invention, in the case of determining whether the collation image acquired in a real environment is a person registered in a white list, large weight is placed on the transformation formula created in preliminary learning when the number of application learning images acquired in the real environment is small, so that a stable determination result can be obtained, and large weight is placed on the transformation formula created in application learning images when the number of application learning images acquired in the real environment is large, so that a determination result adapted for the real environment can be obtained.

BRIEF DESCRIPTION OF THE DRAWINGS

FIG. 7 is an explanatory diagram showing a feature of the first embodiment of the invention.

MODE FOR CARRYING OUT THE INVENTION

First Embodiment

Figure 1:
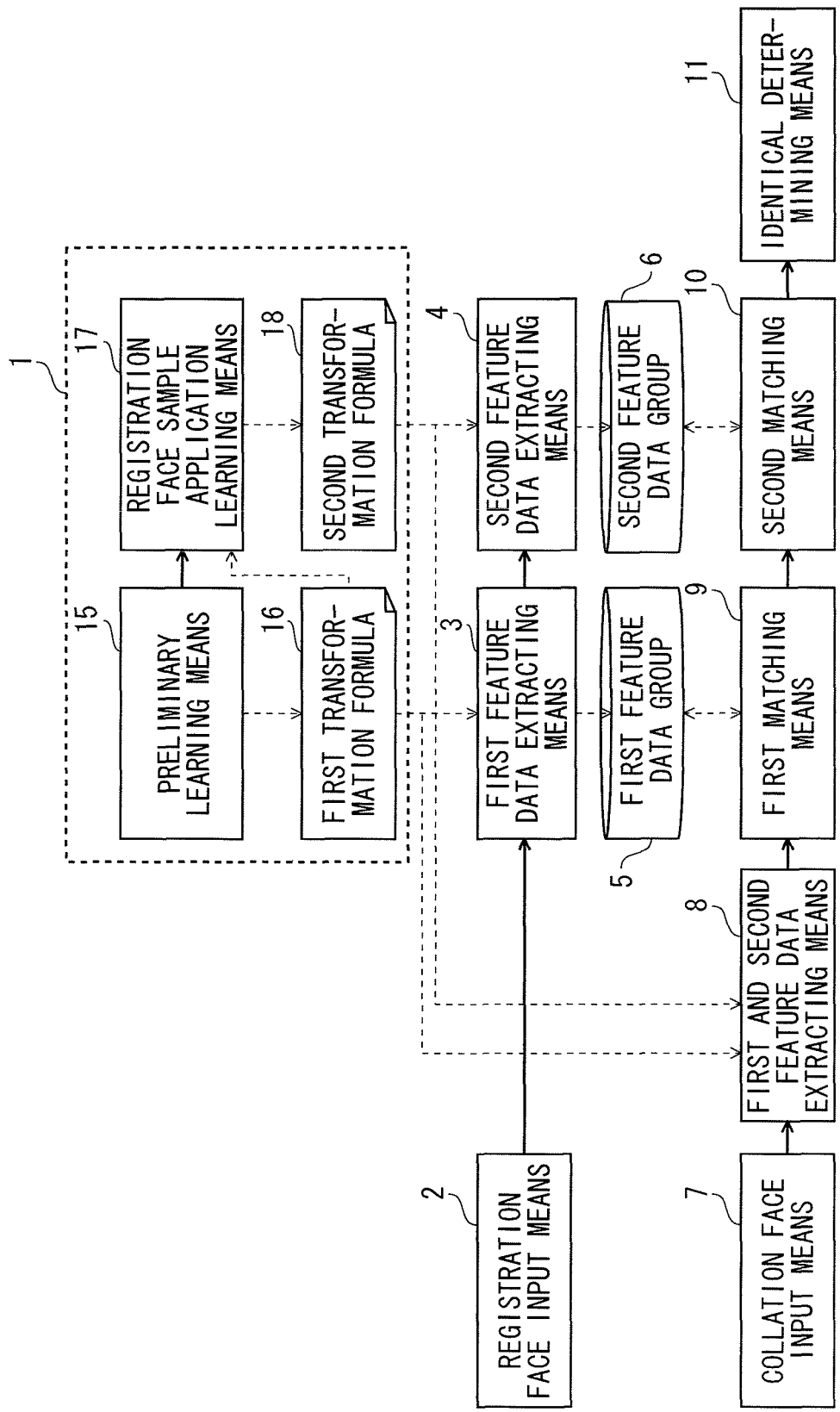
FIG. 1 is a block configuration diagram showing a configuration of a first embodiment of the invention.

A first embodiment according to the invention will hereinafter be described in detail by the drawings. FIG. 1 is a block diagram showing the first embodiment of a white list inside or outside determining apparatus of the invention.

In FIG. 1, initialization processing 1 includes preliminary learning means 15, a first transformation formula 16 created by the preliminary learning means 15, registration face sample application learning means 17, and a second transformation formula 18 created by the registration face sample application learning means 17.

A configuration other than the initialization processing 1 of the white list inside or outside determining apparatus includes registration face input means 2 for inputting a face image of a white list, first feature data extracting means 3 for transforming the input face image of the white list by the first transformation formula 16, a first feature data group 5 for holding the extracted first feature data, second feature data extracting means 4 for transforming the input face image of the white list by the second transformation formula 18, a second feature data group 6 for holding the extracted second feature data, collation face input means 7 for inputting a collation face, first and second feature data extracting means 8 for extracting first feature data and second feature data of a collation face image, first matching means 9 for performing matching between the first feature data group and the first feature data of the collation face extracted, second matching means 10 for performing matching between the second feature data group and the second feature data of the collation face extracted, and identical determining means 11 for determining whether or not the collation image is registered in the white list using results of the first matching means 9 and the second matching means 10.

Next, an outline of the invention will be described using FIG. 2. A method for making a white list inside or outside determination by minimizing within-person variance and also maximizing between-person variance using a FisherFace method described in Non-Patent Document 1 will be described first.

The FisherFace method is a method capable of stably doing calculation for minimizing within-class variance and maximizing between-class variance after obtaining a learning result by PCA even when the number of images given every class is small.

In the case of using this method, a transformation formula for minimizing within-person variance and maximizing between-person variance with respect to a face image of a person registered in the white list can be obtained.

First, feature space is created by a PCA (Principal Component Analysis) method using numerous face images (for example, for 3000 persons). Also, by FLD, within-person variance is minimized and between-person variance is maximized (numeral 21 of FIG. 2). As a result, Mathematical Formula 10 is obtained as a first transformation formula (numeral 16 of FIG. 2).

$$W_{fld}$$ [Mathematical Formula 10]

Figure 2:
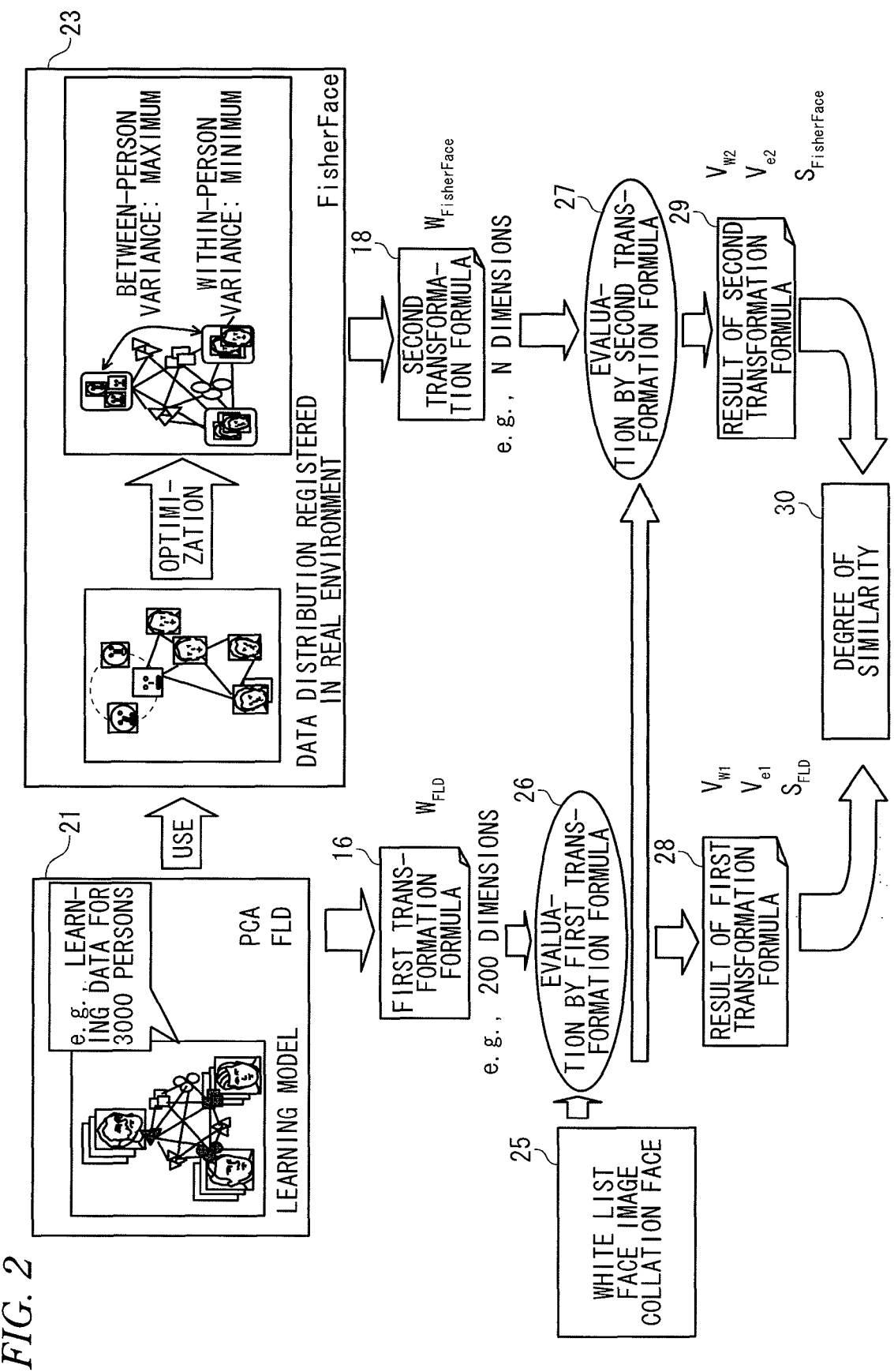
FIG. 2 is an explanatory diagram showing a flow of processing of the first embodiment of the invention.

Next, with respect to feature data after first transformation of a face image acquired in an environment in which a white list collating apparatus is installed, within-person variance of feature space is minimized and between-person variance is maximized by the FisherFace method (numeral 23 of FIG. 2). As a result, Mathematical Formula 11 is obtained as a second transformation formula (numeral 18 of FIG. 2).

$$W_{FisherFace}$$ [Mathematical Formula 11]

In the case of performing white list face collation, Mathematical Formula 13 is obtained by (Mathematical Formula 10) (numeral 26 of FIG. 2) when a face image (numeral 25 of FIG. 2) registered in a white list is expressed by Mathematical Formula 12.

$$F_w$$ [Mathematical Formula 12]

$$V_{w1}=W_{fld}F_w$$ [Mathematical Formula 13]

On the other hand, Mathematical Formula 15 is obtained by (Mathematical Formula 10) (numeral 27 of FIG. 2) when a collation face image is expressed by Mathematical Formula 14.

$$F_e$$ [Mathematical Formula 14]

$$V_{e1}=W_{fld}F_e$$ [Mathematical Formula 15]

Then, when a threshold value is expressed by $W_{FLD}$, the degree of similarity by the first transformation formula is expressed as follows (numeral 28 of FIG. 2).

$$S_{FLD} = 1 - \frac{|V_{e1} - V_{w1}|}{T_{FLD}}$$ [Mathematical Formula 16]

When the degree of similarity becomes minus, it is decided that the face images are not similar, and when the degree of similarity becomes plus, this is targeted for consideration.

Similarly, when a feature amount of the white list obtained by the second transformation formula is expressed by $V_{w2}$ and a feature amount of a collation face image obtained by the second transformation formula is expressed by $V_{e2}$, the degree of similarity by FisherFace is expressed as follows (numeral 29 of FIG. 2).

$$S_{FisherFace} = 1 - \frac{|V_{e2} - V_{w2}|}{T_{FisherFace}}$$ [Mathematical Formula 17]

However, $T_{FisherFace}$ is a threshold value.

When weights are expressed by w1 and w2, the final degree of similarity can be obtained as follows (numeral 30 of FIG. 2).

$$S=w_1 \cdot S_{FLD}+w_2 \times S_{FisherFace}$$ [Mathematical Formula 18]

where, $$w_1+w_2=1$$ [Mathematical Formula 19]

Then, when a value of S (Mathematical Formula 18) is more than or equal to a predetermined threshold value, it is decided that a collation face is registered in the white list, and when the value of S is less than the predetermined threshold value, it is decided that a collation face image is not within the white list.

At this time, values of w1 and w2 are changed by a ratio between the number of face images used in a learning model and the number of images acquired in real space.

That is, in the first embodiment of the invention, the final degree of similarity is obtained by changing a contribution ratio of the degree of similarity obtained using the first transformation formula and the degree of similarity obtained using the second transformation formula according to a ratio between the number of learning images used in the preliminary learning means 15 and the number of images used in the registration face sample application learning means 17.

Accordingly, when the number of images at the time of doing registration face sample application learning is small and a calculated result of the degree of similarity using the second transformation formula becomes unstable, weight of a result of the degree of similarity using the first transformation formula can be increased, so that a stable result can be obtained. On the other hand, when the number of images at the time of doing the registration face sample application learning is large, weight of a calculated result of the degree of similarity using the second transformation formula can be increased, so that a result adapted for a real environment can be obtained when images for registration face sample application learning are acquired in the real environment.

Next, a flow of processing of the first embodiment of the invention will be described using FIGS. 1 to 6. First, the initialization processing 1 of FIG. 1 will be described. The preliminary learning means 15 creates the first transformation formula 16 from many learning data using PCA and FLD as described by numeral 21 of FIG. 2. Also, the registration face sample application learning means creates the second transformation formula 18 from the first transformation formula 16 by the FisherFace method using sample images acquired in a real environment.

Figure 3:
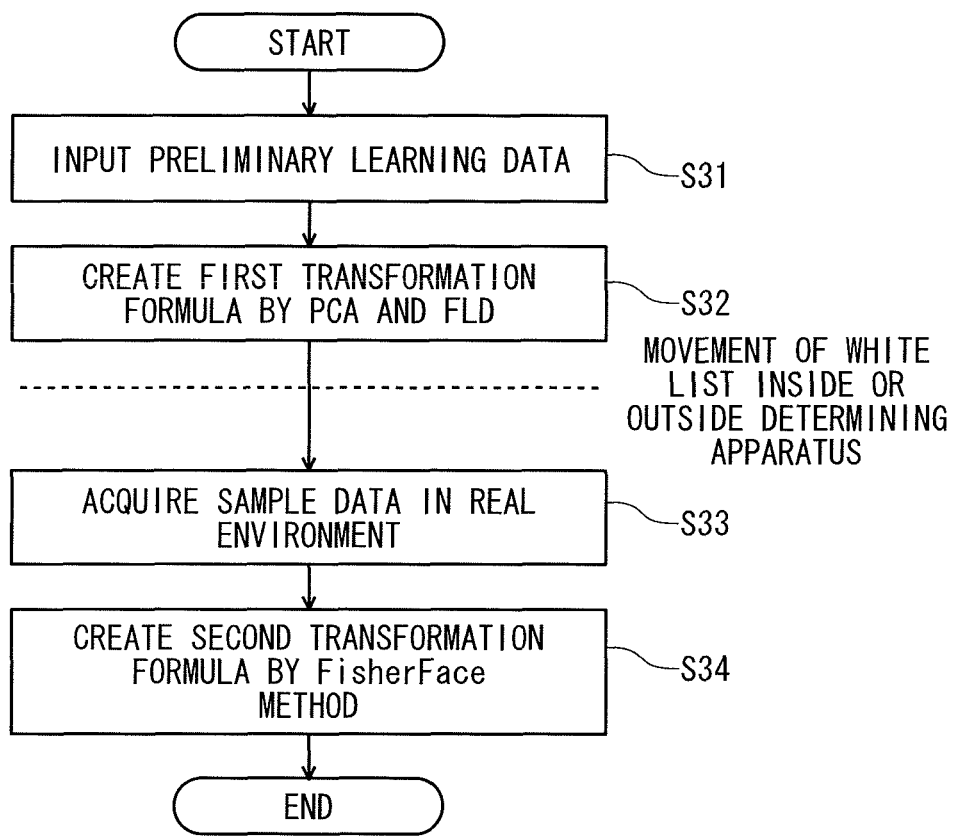
FIG. 3 is a flow diagram showing a flow of initialization processing of the first embodiment of the invention.

FIG. 3 shows a flow of the initialization processing 1. In a preliminary learning data input (S31), numerous face images for, for example, 3000 persons for use in preliminary learning are input. Next, in creation of the first transformation formula by PCA and FLD (S32), the first transformation formula 16 (Mathematical Formula 10) is obtained.

Then, the white list inside or outside determining apparatus is moved in a place operating actually. Then, data acquisition in the real environment (S33) is performed. Then, the second transformation formula 18 (Mathematical Formula 11) is created (S34) by the FisherFace method.

Next, registration of a face image registered in a white list will be described. In FIG. 1, an image registered in the white list is input from the registration face input means 2. Then, first feature data is extracted using the first transformation formula 16 by the first feature data extracting means 3 and is held in the first feature data group 5.

Also, in the image registered in the white list and input from the registration face input means 2, second feature data is extracted using the second transformation formula 18 by the second feature data extracting means 4 and is held in the second feature data group 6.

Next, when the white list inside or outside determining apparatus is installed in the real environment, a face image for collation of a person in the real environment is input by the collation face input means 7.

In the face image for collation, first feature data and second feature data are created using the first transformation formula 16 and the second transformation formula 18 by the first and second feature data extracting means 8.

Then, matching between the first feature data of the face image for collation and feature data held in the first feature data group 5 is performed by the first matching means 9.

Similarly, matching between the second feature data of the face image for collation and feature data held in the second feature data group 6 is performed by the second matching means 10.

Then, the identical determining means 11 determines whether or not the face image for collation matches with the face image registered in the white list.

Figure 4:
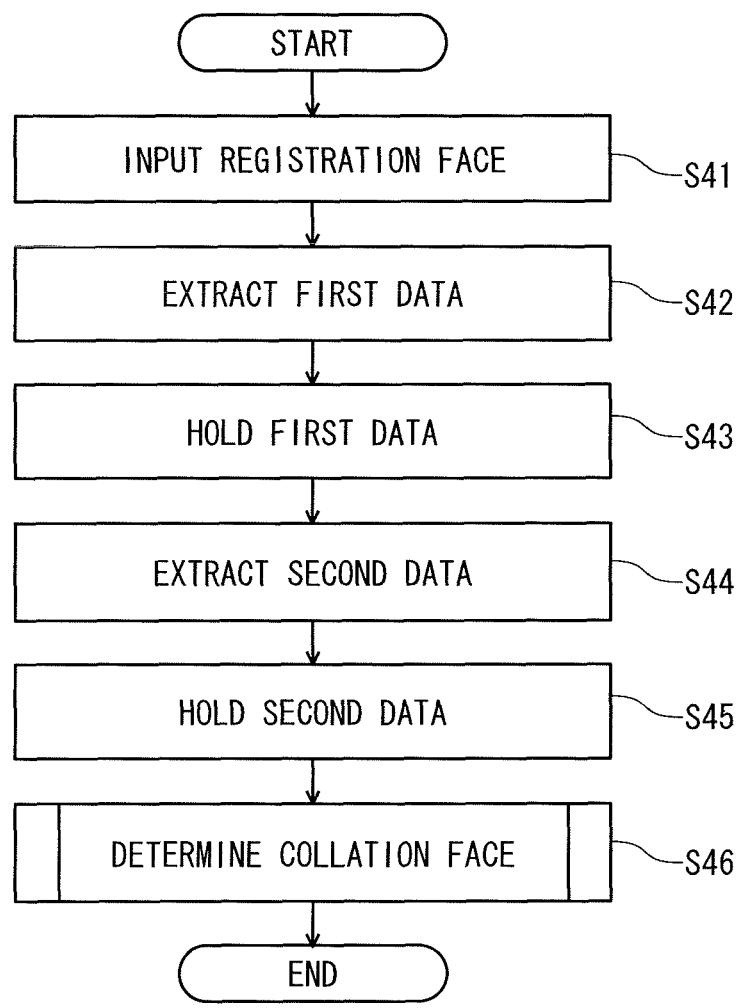
FIG. 4 is a flow diagram showing a flow of the first embodiment of the invention.

FIG. 4 is a flowchart showing a range from registration of the face image of a person registered in the white list to determination of the face image for collation.

In a registration face input (S41), a face image registered as the white list is input. In first data extraction (S42), a feature amount of a face image to be registered in the white list is extracted using the first transformation formula 16. Then, in first data holding (S43), the feature amount is registered in the first feature data group 5.

In second data extraction (S44), a feature amount of a face image to be registered in the white list is extracted using the second transformation formula 18. Then, in second data holding (S45), the feature amount is registered in the second feature data group 6.

Then, in determination (S46) of a collation face, the collation face is determined.

Figure 5:
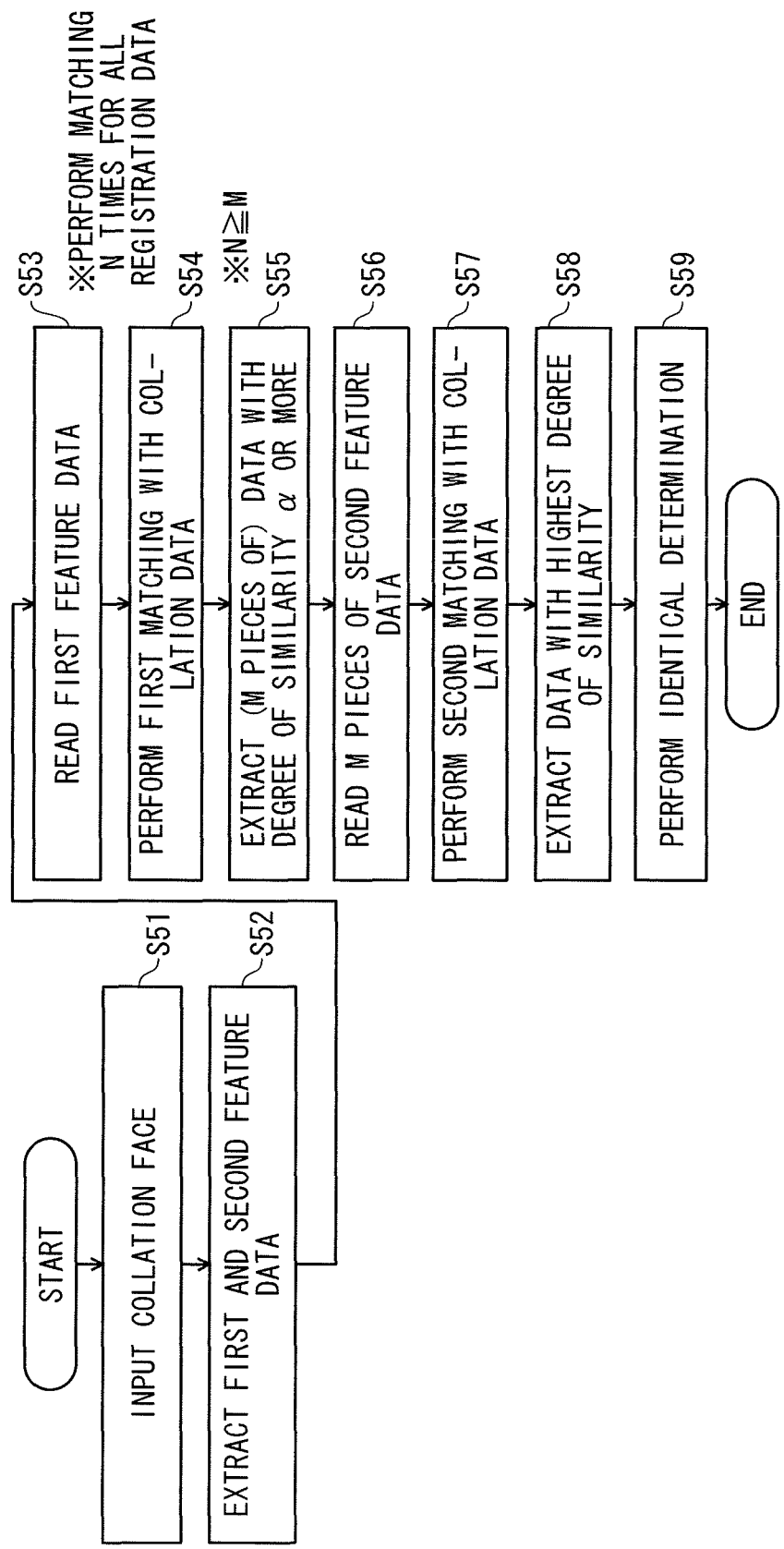
FIG. 5 is a flow diagram showing a flow of the first determination of a collation face of the first embodiment of the invention.
Figure 6:
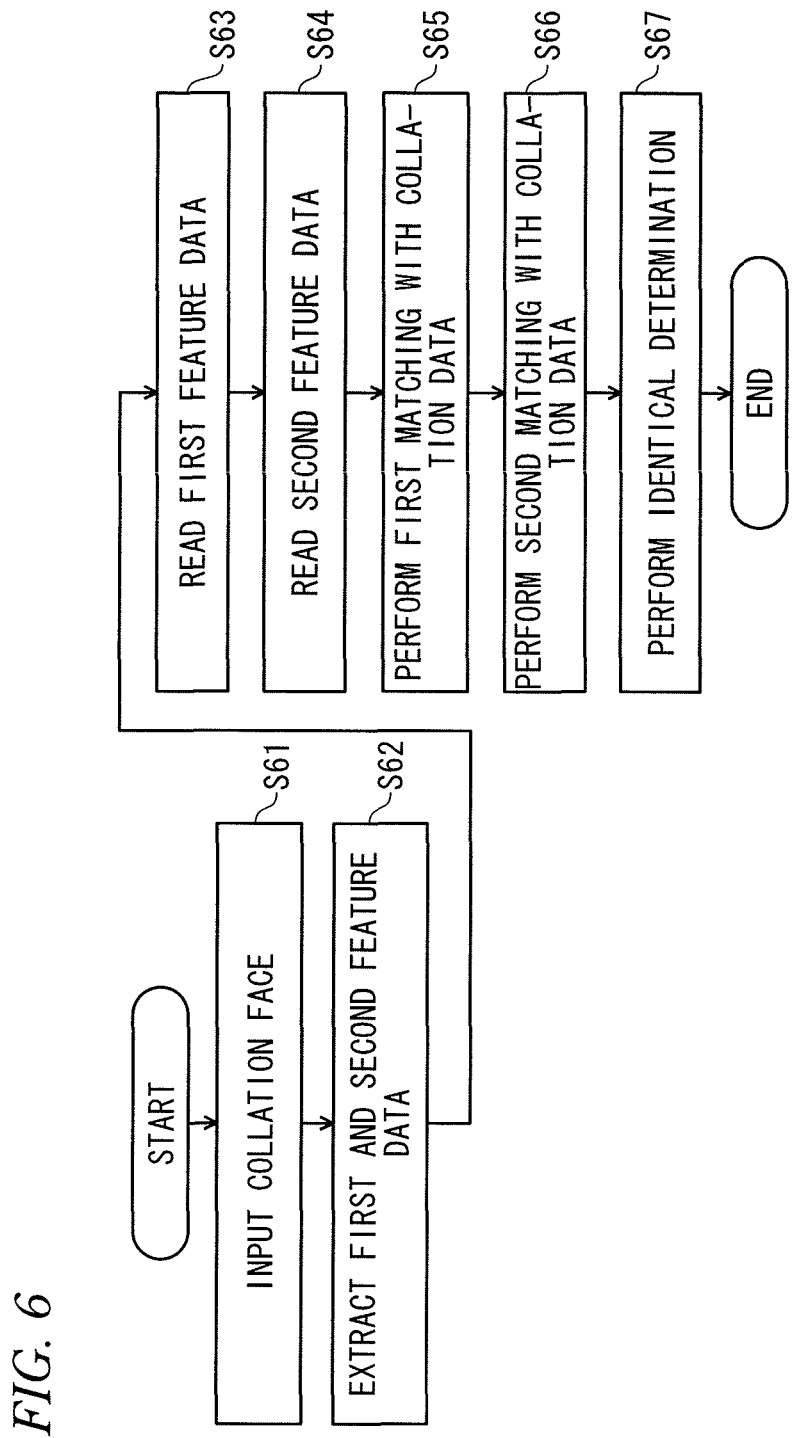
FIG. 6 is a flow diagram showing a flow of the second determination of a collation face of the first embodiment of the invention.

FIGS. 5 and 6 show the inside of determination (S46) of the collation face, and FIG. 5 shows the first technique and FIG. 6 shows the second technique.

In FIG. 5, in a collation face input (S51), collation face data for determining whether or not to be a person registered in the white list is input by the collation face input means 7 in the real environment.

In first and second feature data extraction (S52), first and second feature data of the collation face are extracted using the first transformation formula 16 and the second transformation formula 18 by the first and second feature data extracting means 8.

In first feature data reading (S53), a first feature of a face image registered in the white list and held in the first feature data group 5 is read.

In matching with collation data (S54), matching between a feature amount of the collation face and feature data held in the first feature data group 5 is performed by the first matching means 9.

At this time, in extraction of (M) data whose degree of similarity is a or more (S55), a person registered in the white list, whose degree of similarity is a or more, is selected by a result of matching in S54.

M second feature amounts are read out of the second feature data group 6 (S56).

In second matching with collation data (S57), matching between a feature amount of the collation face and M second feature data read out by S56 is performed by the second matching means 10.

Then, a person with the highest degree of similarity and registered in the white list is selected by extraction of data with the highest degree of similarity (S58).

In identical determination (S59), it is determined that a collation image is a person registered in the white list when the degree of similarity is more than or equal to a predetermined threshold value ($\beta$).

As a method of determination in this case, the method described in (Mathematical Formula 16) to (Mathematical Formula 19) is used, and values of w1 and w2 are determined by a ratio between the number of face images used in the preliminary learning means 15 and the number of images acquired in the real environment used in the registration face sample application learning means 17 acquired in the real environment.

For example, the values of w1 and w2 are set so that (w1:w2)=(0.2:0.8) is satisfied when the number of persons of registration data is large and (w1:w2)=(0.5:0.5) is satisfied when the number of persons of registration data is small.

Consequently, when the number of registration face samples acquired in the real environment is small, the degree of similarity obtained using the first transformation formula has priority over the degree of similarity obtained using the second transformation formula, so that a stable result can be obtained.

Next, the second technique of determination (S46) of the collation face of FIG. 4 will be described using FIG. 6.

In FIG. 6, the portion ranging to first feature data reading (S63) is similar to that of the first technique of FIG. 5.

Also, in second feature data reading (S64), all the second feature amounts held in the second feature data group 6 are read by the second matching means 10.

In first matching with collation data (S65), matching between a feature amount of a collation image extracted by the first and second feature data extracting means 8 and a feature amount read out of the first feature data group 5 is performed by the first matching means 9.

In second matching with collation data (S66), matching between a feature amount of a collation image extracted by the first and second feature data extracting means 8 and a feature amount read out of the second feature data group 6 is performed by the second matching means 10.

Finally, the identical determining means (S67) determines whether or not the collation image is identical to the face image registered in the white list using these degrees of similarity.

A method of identical determination is the same as the method described in FIG. 5.

FIG. 7 shows advantages of the invention. For example, even when there are many frontal faces as preliminary registration data, a change in face direction can be handled by the second transformation formula. Also, when the number of images other than the frontal faces acquired in the real environment is small, a situation in which a system becomes unstable due to too dependence on the second transformation formula can be reduced.

Also, when an illumination condition differs from that of preliminary learning, there is an advantage capable of covering a difference in an actual illumination condition by the second transformation formula.

Second Embodiment

Figure 8:
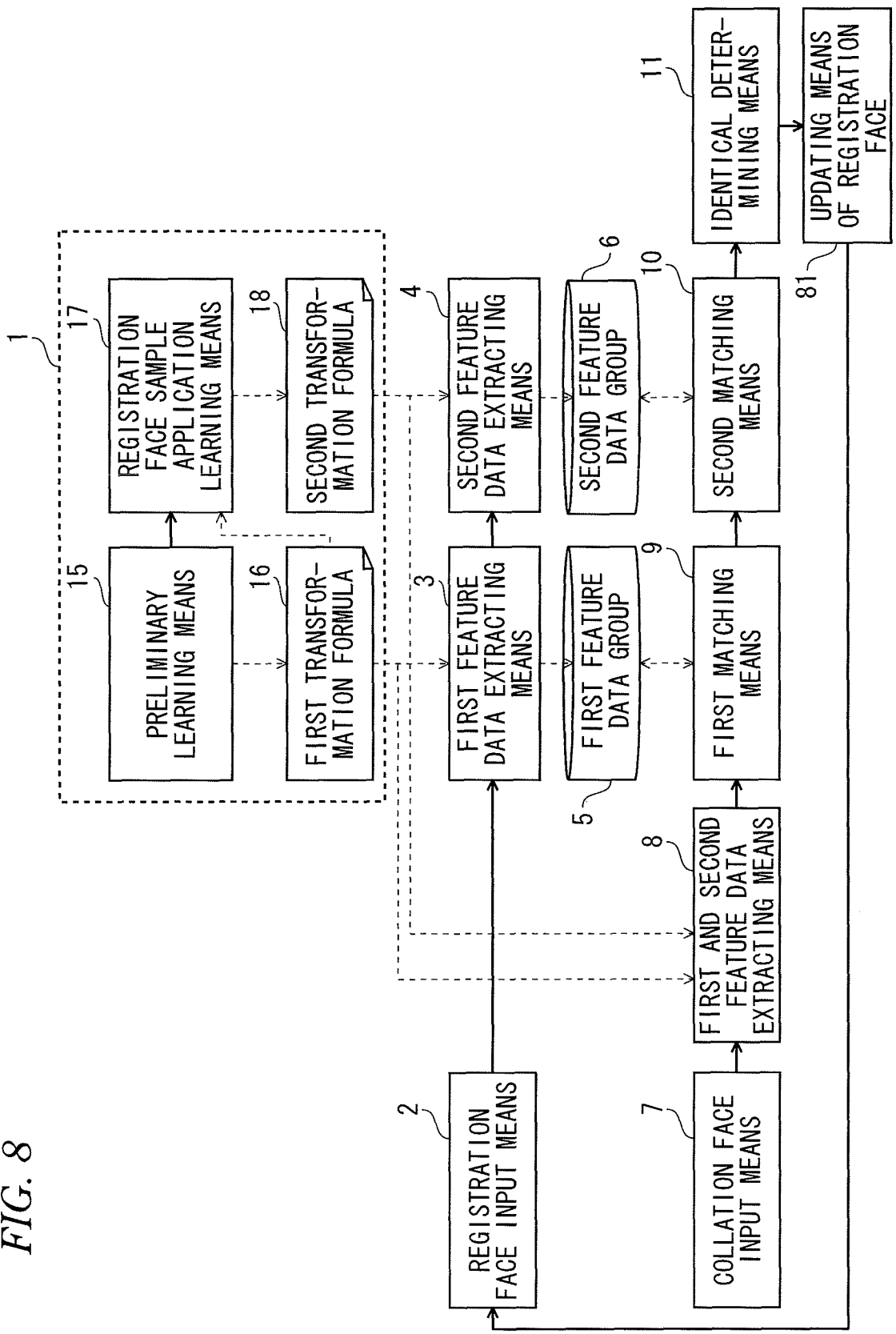
FIG. 8 is a block configuration diagram showing a configuration of a second embodiment of the invention.

FIG. 8 shows a second embodiment of the invention. The second embodiment newly has updating means 81 of a registration face as compared with the first embodiment.

The updating means 81 of the registration face can also set a face image acquired in a real environment at a face image to be registered in a white list when the degree of similarity is a predetermined threshold value (γ, γ≥β) in the first embodiment. Accordingly, the face image registered in the white list can be adapted for the real environment.

Figure 9:
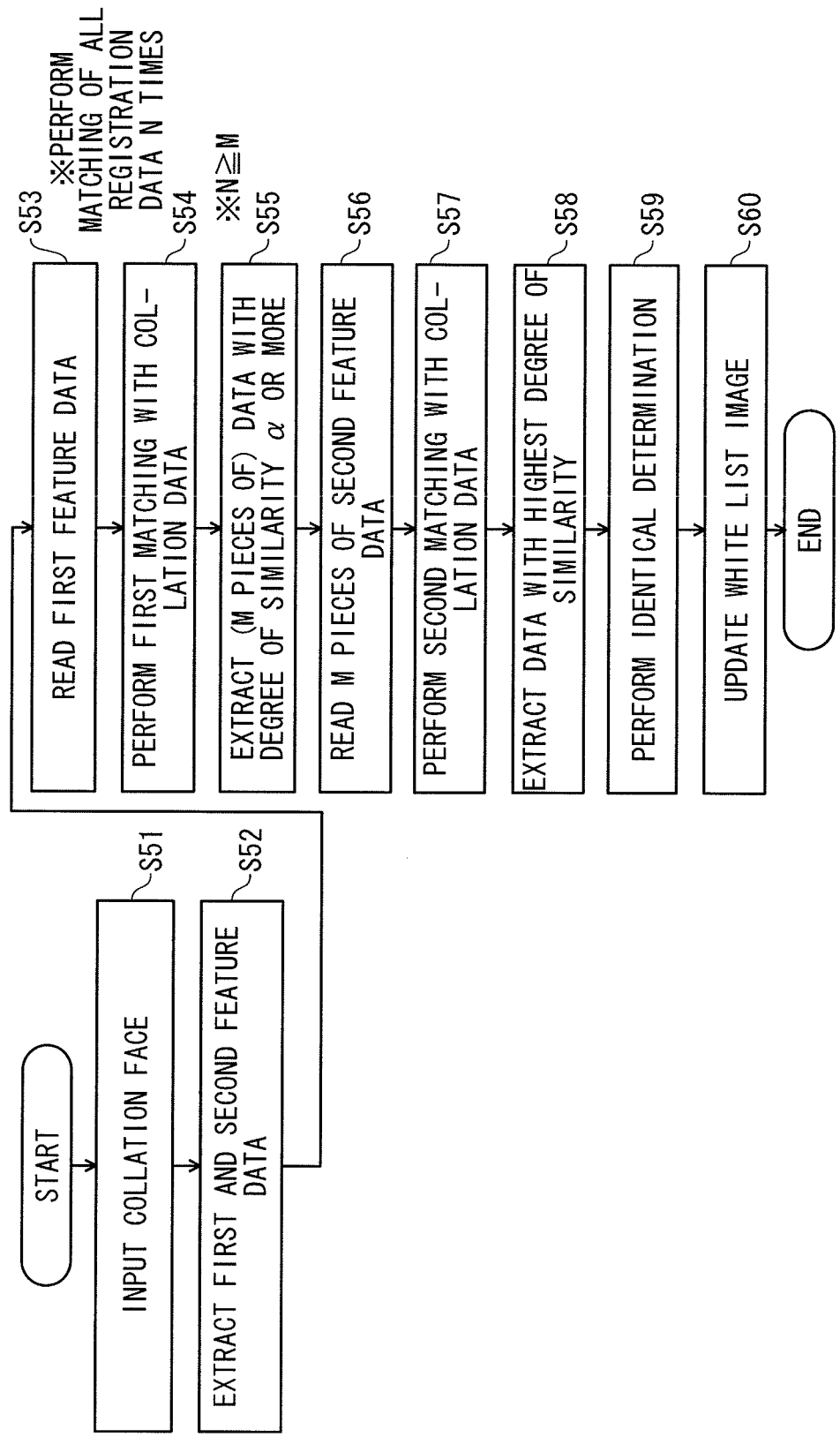
FIG. 9 is a flow diagram showing a flow of initialization processing of the second embodiment of the invention.

FIG. 9 shows a flow of the second embodiment of the invention. When the degree of similarity exceeds a predetermined threshold value (γ, γ≥β) as a result of identical determination in the second embodiment, an image acquired in the real environment is registered in the white list (S91). The other steps are similar to those of FIG. 5.

Figure 10:
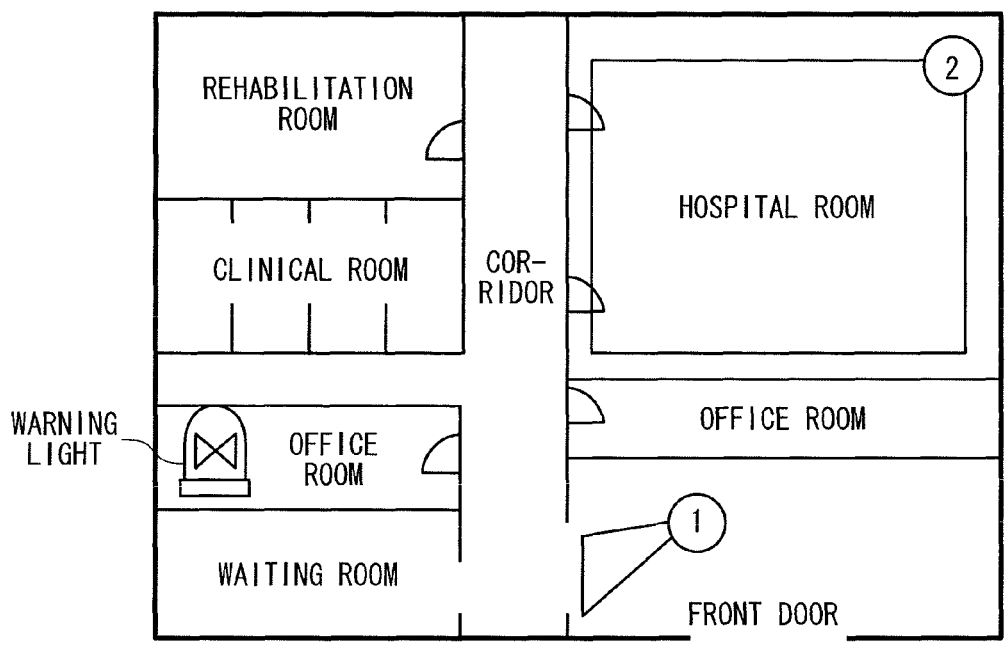
FIG. 10 is an explanatory diagram showing a usage situation of the second embodiment of the invention.
Figure 11:
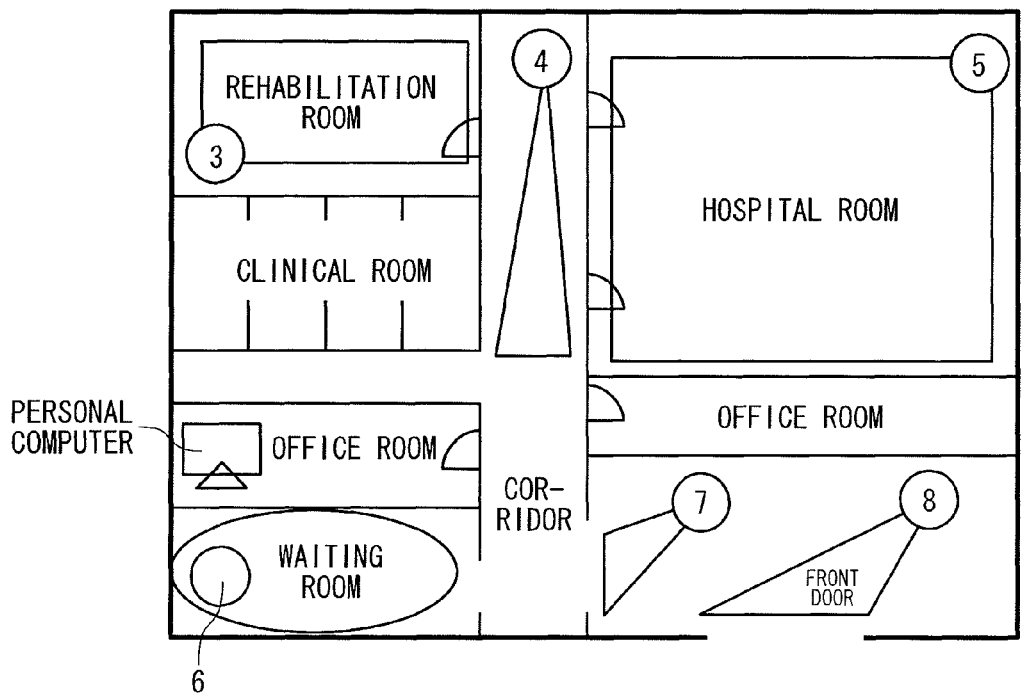
FIG. 11 is an explanatory diagram showing a usage situation of the second embodiment of the invention.
Figure 12:
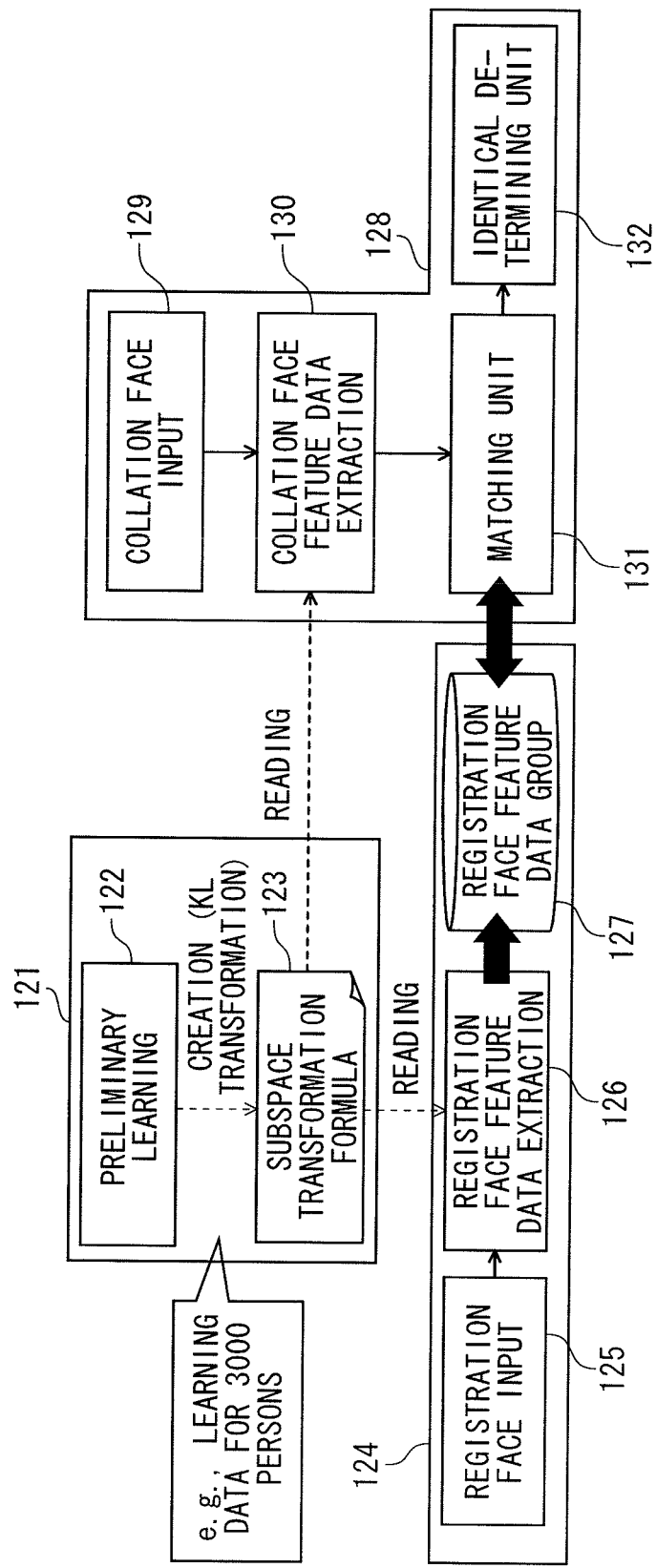
FIG. 12 is a block configuration diagram of a conventional white list inside or outside determining apparatus.
Figure 13:
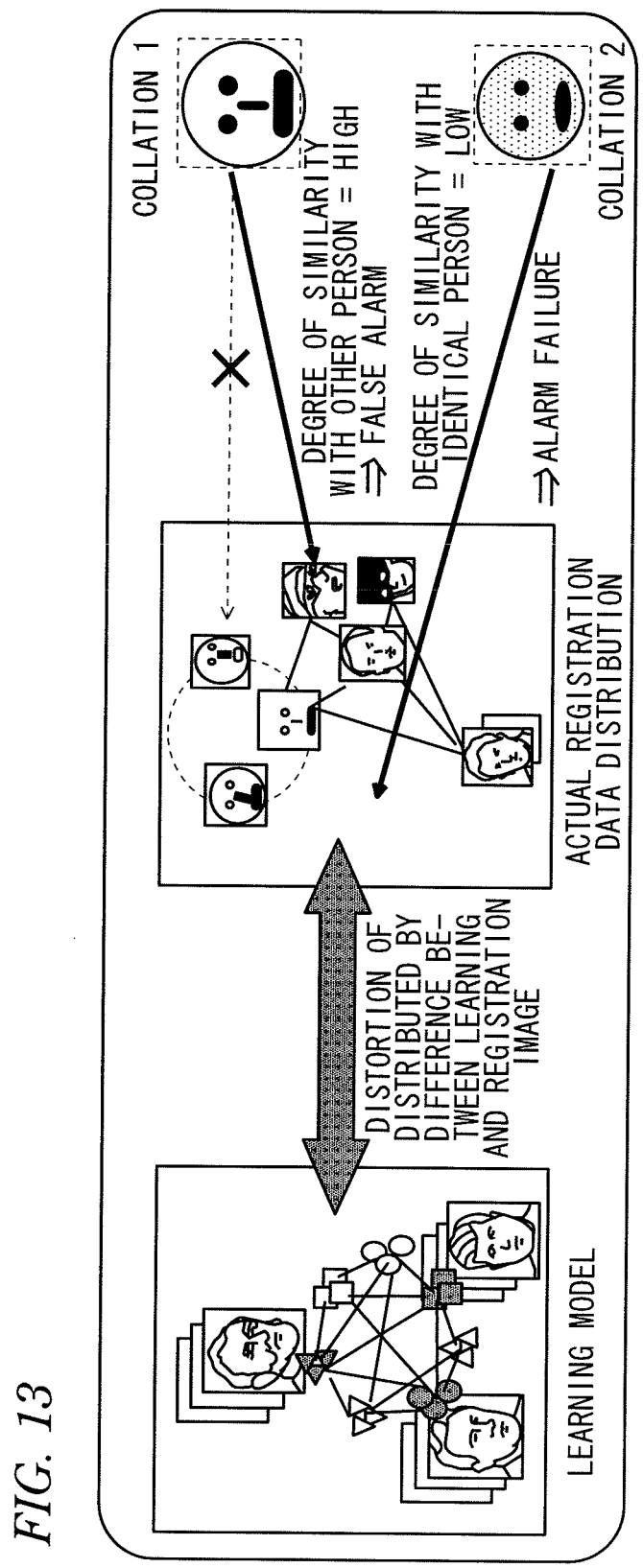
FIG. 13 is an explanatory diagram of the conventional white list inside or outside determining apparatus.

FIGS. 10 and 11 show a usage situation of the invention. FIG. 10 shows an unauthorized outing of a patient in a hospital by a camera 1) or intrusion of an unregistered person into the hospital by a camera 2).

Since an inpatient has many occasions photographed by the camera, once the inpatient is registered in a white list, the inpatient is recognized and updated as a person registered in the white list many times, so that it becomes easy to detect the inpatient in the case of attempting to go out of the front door without leave.

On the other hand, persons other than the inpatients or normal workers in the hospital are not collated as the person registered in the white list, so that intrusion of a suspicious person can be detected easily.

FIG. 11 shows an example of checking the whereabouts of inpatients or workers in a hospital. When a name of a patient or a hospital worker is input from a personal computer of an office room, an applicable person is sought and displayed from a camera 3) of a rehabilitation room, a camera 4) set on a corridor, a camera 5) of a hospital room, a camera 6) installed in a waiting room, cameras 7) and 8) installed at the front door, etc. for a period of the last several hours (or several minutes).

In addition, in FIG. 3, the white list inside or outside determining apparatus is moved in a place operating actually, but is not necessarily moved.

The invention has been described in detail with reference to the specific embodiments, but it is apparent to those skilled in the art that various changes or modifications can be made without departing from the spirit and scope of the invention.

The present application is based on Japanese patent application (patent application No. 2010-214883) filed on Sep. 27, 2010, and the contents of the patent application are hereby incorporated by reference.

INDUSTRIAL APPLICABILITY

The invention is the invention according to a white list inside or outside determining apparatus and method capable of detecting, for example, intrusion of a suspicious person or the whereabouts in a hospital of a person registered as a white list in the hospital etc.

DESCRIPTION OF REFERENCE SIGNS

1 INITIALIZATION PROCESSING
2 REGISTRATION FACE INPUT MEANS
3 FIRST FEATURE DATA EXTRACTING MEANS
4 SECOND FEATURE DATA EXTRACTING MEANS
5 FIRST FEATURE DATA GROUP
6 SECOND FEATURE DATA GROUP
7 COLLATION FACE INPUT MEANS
8 FIRST AND SECOND FEATURE DATA EXTRACTING MEANS
9 FIRST MATCHING MEANS
10 SECOND MATCHING MEANS
11 IDENTICAL DETERMINING MEANS

The invention claimed is:

1. A white list inside or outside determining apparatus comprising:
a first feature data extracting unit which extracts first feature data from an image by using a first transformation formula created based on a plurality of preliminary learning images;
a second feature data extracting unit which extracts second feature data from an image by using a second transformation formula created from the preliminary learning images and a plurality of application learning images;
a first matching unit which performs matching between a registration image and a collation image by using the first transformation formula; and
a second matching unit which performs matching between a registration image and a collation image by using the second transformation formula,
wherein weights of a matching result of the first matching unit and a matching result of the second matching unit are changed according to the number of preliminary learning images and the number of application learning images.

2. The white list inside or outside determining apparatus according to claim 1,
wherein the weight of the matching result of the second matching unit is decreased as the number of application learning images becomes smaller.

3. The white list inside or outside determining apparatus according to claim 1,
wherein the collation image is registered as the registration image when a degree of similarity is larger than a predetermined threshold value.

4. A white list inside or outside determining method comprising:
extracting first feature data from an image by using a first transformation formula created based on a plurality of preliminary learning images;
extracting second feature data from an image by using a second transformation formula created from the preliminary learning images and a plurality of application learning images;
performing a first matching between a registration image and a collation image by using the first transformation formula; and
performing a second matching between a registration image and a collation image by using the second transformation formula,
wherein weights of a matching result of the first matching and a matching result of the second matching are changed according to the number of preliminary learning images and the number of application learning images.

* * * * *